(12) United States Patent
Park et al.

(10) Patent No.: US 12,258,046 B2
(45) Date of Patent: Mar. 25, 2025

(54) VEHICLE AND CONTROL METHOD THEREOF

(71) Applicants: Hyundai Motor Company, Seoul (KR); Kia Corporation, Seoul (KR); Kyungshin Corp., Incheon (KR)

(72) Inventors: Sehoon Park, Yongin-si (KR); In Sic Kim, Incheon (KR); Dong-Hyun Park, Incheon (KR)

(73) Assignees: Hyundai Motor Company, Seoul (KR); Kia Corporation, Seoul (KR); Kyungshin Corp., Incheon (KR)

( * ) Notice: Subject to any disclaimer, the term of this patent is extended or adjusted under 35 U.S.C. 154(b) by 292 days.

(21) Appl. No.: 17/897,627

(22) Filed: Aug. 29, 2022

(65) Prior Publication Data
US 2023/0086986 A1 Mar. 23, 2023

(30) Foreign Application Priority Data
Sep. 17, 2021 (KR) .................. 10-2021-0124760

(51) Int. Cl.
*B60W 60/00* (2020.01)
*B60R 16/023* (2006.01)
(Continued)

(52) U.S. Cl.
CPC ... *B60W 60/00186* (2020.02); *B60R 16/0238* (2013.01); *B60W 50/14* (2013.01);
(Continued)

(58) Field of Classification Search
CPC .......... B60W 60/00186; B60W 50/14; B60W 2510/242; B60R 16/0238; H02J 7/0047; H02J 9/06; H02J 7/0013
(Continued)

(56) References Cited

U.S. PATENT DOCUMENTS 9,802,562 B2   10/2017   Yasunori et al.
2001/0028241 A1 10/2001   Saito et al.
(Continued)

FOREIGN PATENT DOCUMENTS

JP   3234861 B2    12/2001
JP   2020191773 A  11/2020
(Continued)

*Primary Examiner* — Michael R. Fin
(74) *Attorney, Agent, or Firm* — Slater Matsil, LLP

(57) ABSTRACT

A vehicle includes a power supplier, a junction block configured to supply power from the power supplier, an integrated central control unit configured to receive the power from the junction block, a controller configured to be receive the power through the integrated central control unit and to control at least one load unit of the vehicle, and a control unit configured to identify a power failure location of the vehicle and to determine a power supply method of the junction block during an autonomous driving of the vehicle, based on power monitoring information of each of the integrated central control unit, the junction block, and the controller and predetermined condition information, the predetermined condition information including power supply state information and power supply method information of each load unit corresponding to each of a plurality of pieces of power failure location information.

20 Claims, 9 Drawing Sheets

(51) Int. Cl.
*B60W 50/14* (2020.01)
*H02J 7/00* (2006.01)
*H02J 9/06* (2006.01)

(52) U.S. Cl.
CPC .............. *H02J 7/0047* (2013.01); *H02J 9/06* (2013.01); *B60W 2510/242* (2013.01); *H02J 7/0013* (2013.01)

(58) Field of Classification Search
USPC .................................................. 307/9.1, 10.1
See application file for complete search history.

(56) References Cited

U.S. PATENT DOCUMENTS

| | | | |
|---|---|---|---|
| 2001/0054847 | A1 | 12/2001 | Yoshida et al. |
| 2016/0236790 | A1* | 8/2016 | Knapp .................... B64C 11/44 |
| 2018/0354436 | A1* | 12/2018 | Sato ....................... H02H 7/268 |
| 2020/0062199 | A1 | 2/2020 | Kwon |
| 2020/0369227 | A1 | 11/2020 | Park et al. |
| 2021/0276576 | A1* | 9/2021 | Ribbens ................ B60W 50/14 |

FOREIGN PATENT DOCUMENTS

| | | | |
|---|---|---|---|
| KR | 20200022674 | A | 3/2020 |
| KR | 20200023711 | A | 3/2020 |
| KR | 20200078909 | A | 7/2020 |
| KR | 102192893 | B1 | 12/2020 |
| WO | 9626570 | A1 | 8/1996 |

* cited by examiner

VEHICLE AND CONTROL METHOD THEREOF

CROSS-REFERENCE TO RELATED APPLICATIONS

This application claims the benefit of Korean Patent Application No. 10-2021-0124760, filed on Sep. 17, 2021, which application is hereby incorporated herein by reference.

TECHNICAL FIELD

The disclosure relates to a vehicle and a control method thereof.

BACKGROUND

Currently, a vehicle with an internal combustion engine may monitor an ignition (IGN) power supply. When the ignition power fails, however, where the failure occurs may not be identified, causing an increase in repair time and cost due to replacement of the entire junction block.

Meanwhile, an autonomous vehicle includes a main power supply and an auxiliary power supply (also referred to as a backup power supply) for power redundancy, and the safety of the power system is critical.

An autonomous vehicle uses an ignition power supply for normal functions of main controllers of the autonomous vehicle, e.g., anti-lock brake system (ABS), airbag control unit (ACU), body control module (BCM), immobilizer (IMMO), electronic control unit (ECU), motor driven power steering (MDPS), and the like. Accordingly, the ignition power is directly related to the safe driving of autonomous vehicles.

Thus, a failure in the ignition power of an autonomous vehicle may lead to serious traffic accidents, and may also cause not only excessive cost but also a violation of law.

SUMMARY

An embodiment of the disclosure provides a vehicle and a control method thereof that may identify a failure of an ignition power of the vehicle and where the failure occurs.

For example, the vehicle and the control method thereof may provide a power redundancy scheme against the failure of a main power in a controller of the vehicle and an ignition power.

Also, the vehicle and the control method thereof may prevent an accident by identifying where the failure occurs, when ignition power is not supplied.

Additional embodiments of the disclosure will be set forth in part in the description which follows and, in part, will be obvious from the description, or may be learned by practice of the disclosure.

According to an embodiment of the disclosure, there is provided a vehicle including a power supplier, a junction block configured to supply power of the power supplier, an integrated central control unit configured to be supplied with the power from the junction block, a controller configured to be supplied with the power through the integrated central control unit and to control at least one load unit of the vehicle, and a control unit configured to identify a power failure location of the vehicle and determine a power supply method of the junction block during an autonomous driving of the vehicle, based on power monitoring information of each of the integrated central control unit, the junction block, and the controller and predetermined condition information, the predetermined condition information including power supply state information and power supply method information of each load unit corresponding to each of a plurality of pieces of power failure location information.

The power supplier includes a main power supplier and an auxiliary power supplier, the junction block further includes a switch configured to electrically connect or disconnect the main power supplier and the auxiliary power supplier, and the control unit is configured to control the switch to electrically disconnect the main power supplier and the auxiliary power supplier from each other based on the power failure location, and control so that the power is supplied through one of the main power supplier and the auxiliary power supplier, based on controlling the switch to electrically disconnect the main power supplier and the auxiliary power supplier from each other.

When the main power supplier is included in the power failure location, the control unit is configured to control the switch to electrically disconnect the main power supplier and the auxiliary power supplier from each other, and to control so that the power is supplied through the auxiliary power supplier, based on controlling the switch to electrically disconnect the main power supplier and the auxiliary power supplier from each other.

The junction block includes a first junction block configured to supply the power to the integrated central control unit and a second junction block and a third junction block configured to be supplied with the power from the integrated central control unit, the first junction block is provided between the main power supplier and the second junction block, the third junction block includes the switch, and the switch is provided between the auxiliary power supplier and the second junction block.

The power monitoring information of each of the integrated central control unit, the junction block, and the controller includes monitoring information of a battery power and an ignition power of the integrated central control unit, monitoring information of an ignition power of the second junction block, monitoring information of an ignition power of the third junction block, and monitoring information of an ignition power of the controller.

The predetermined condition information includes corresponding power failure location information, depending on whether a current of the battery power of the integrated central control unit, a current of the ignition power of the integrated central control unit, a current of the ignition power of the second junction block, a current of the ignition power of the third junction block, and a current of the ignition power of the controller are identified.

The predetermined condition information includes information about power output execution or power output cutoff of the auxiliary power supplier and information about on or off control of the switch corresponding to each of the corresponding power failure location information.

The control unit is further configured to release an autonomous driving mode for the autonomous driving and output a warning message, when the main power supplier is included in the power failure location.

The control unit is further configured to output the warning message, when at least one of the junction block, the integrated central control unit or the controller is included in the power failure location.

When the main power supplier is included in the power failure location, the control unit is further configured to output a warning message, terminate a control for the autonomous driving when a user operation for releasing an autonomous driving mode for the autonomous driving is received within a preset period of time in response to the output of the warning message, and when the user operation is not received within the preset period of time, control the vehicle to pull over onto a side of a road or control the vehicle to head to an auto repair shop within a predetermined distance range.

According to an embodiment of the disclosure, there is provided a control method of a vehicle, the control method including, during an autonomous driving of the vehicle, identifying power monitoring information of each of a junction block configured to supply power of a power supplier, an integrated central control unit configured to be supplied with the power from the junction block, and a controller configured to be supplied with the power through the integrated central control unit and to control at least one load unit of the vehicle, and identifying a power failure location of the vehicle and determining a power supply method of the junction block, based on the power monitoring information and predetermined condition information, the predetermined condition information including power supply state information and power supply method information of each load unit corresponding to each of a plurality of pieces of power failure location information.

The power supplier includes a main power supplier and an auxiliary power supplier, the junction block further includes a switch configured to electrically connect or disconnect the main power supplier and the auxiliary power supplier, and the determining of the power supply method of the junction block includes controlling the switch to electrically disconnect the main power supplier and the auxiliary power supplier from each other based on the power failure location, and controlling so that the power is supplied through one of the main power supplier and the auxiliary power supplier, based on controlling the switch to electrically disconnect the main power supplier and the auxiliary power supplier from each other.

When the main power supplier is included in the power failure location, the determining of the power supply method of the junction block includes controlling the switch to electrically disconnect the main power supplier and the auxiliary power supplier from each other, and controlling so that the power is supplied through the auxiliary power supplier, based on controlling the switch to electrically disconnect the main power supplier and the auxiliary power supplier from each other.

The junction block includes a first junction block configured to supply the power to the integrated central control unit and a second junction block and a third junction block configured to be supplied with the power from the integrated central control unit, the first junction block is provided between the main power supplier and the second junction block, the third junction block includes the switch, and the switch is provided between the auxiliary power supplier and the second junction block.

The power monitoring information of each of the integrated central control unit, the junction block and the controller includes monitoring information of a battery power and an ignition power of the integrated central control unit, monitoring information of an ignition power of the second junction block, monitoring information of an ignition power of the third junction block, and monitoring information of an ignition power of the controller.

The predetermined condition information includes corresponding power failure location information, depending on whether a current of the battery power of the integrated central control unit, a current of the ignition power of the integrated central control unit, a current of the ignition power of the second junction block, a current of the ignition power of the third junction block, and a current of the ignition power of the controller are identified.

The predetermined condition information includes information about power output execution or power output cutoff of the auxiliary power supplier and information about on or off control of the switch corresponding to each of the corresponding power failure location information.

The control method further includes releasing an autonomous driving mode for the autonomous driving and outputting a warning message when the main power supplier is included in the power failure location.

The control method further includes outputting the warning message when at least one of the junction block, the integrated central control unit or the controller is included in the power failure location.

The control method further includes, when the main power supplier is included in the power failure location, outputting a warning message, terminating a control for an autonomous driving, when a user operation for releasing an autonomous driving mode for the autonomous driving is received within a preset period of time in response to the output of the warning message, and when the user operation is not received within the preset period of time, controlling the vehicle to pull over onto a side of a road or controlling the vehicle to head to an auto repair shop within a predetermined distance range.

BRIEF DESCRIPTION OF THE DRAWINGS

These and/or other embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
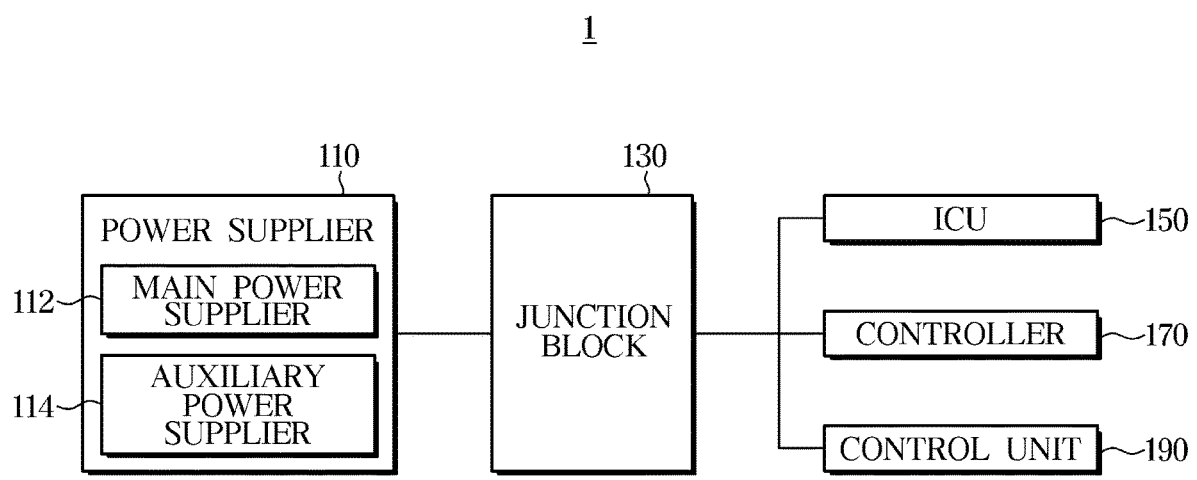
FIGS. 1 and 2 are control block diagrams of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may be implemented with at least one hardware or software. According to embodiments, a plurality of "~parts", "~members", "~modules", "~blocks" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes connection via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

The disclosure may provide a technology capable of moving a vehicle in motion, e.g., an autonomous vehicle in motion, to a safe place from a lane where the vehicle is travelling through power redundancy, in the event of emergency of the vehicle. For example, in the event of failure of the autonomous vehicle, the disclosure may move the vehicle to a safe place while operating a main system of the vehicle for a predetermined period of time.

Hereinafter, an operation principle and embodiments will be described in detail with reference to the accompanying drawings.

Figure 2:
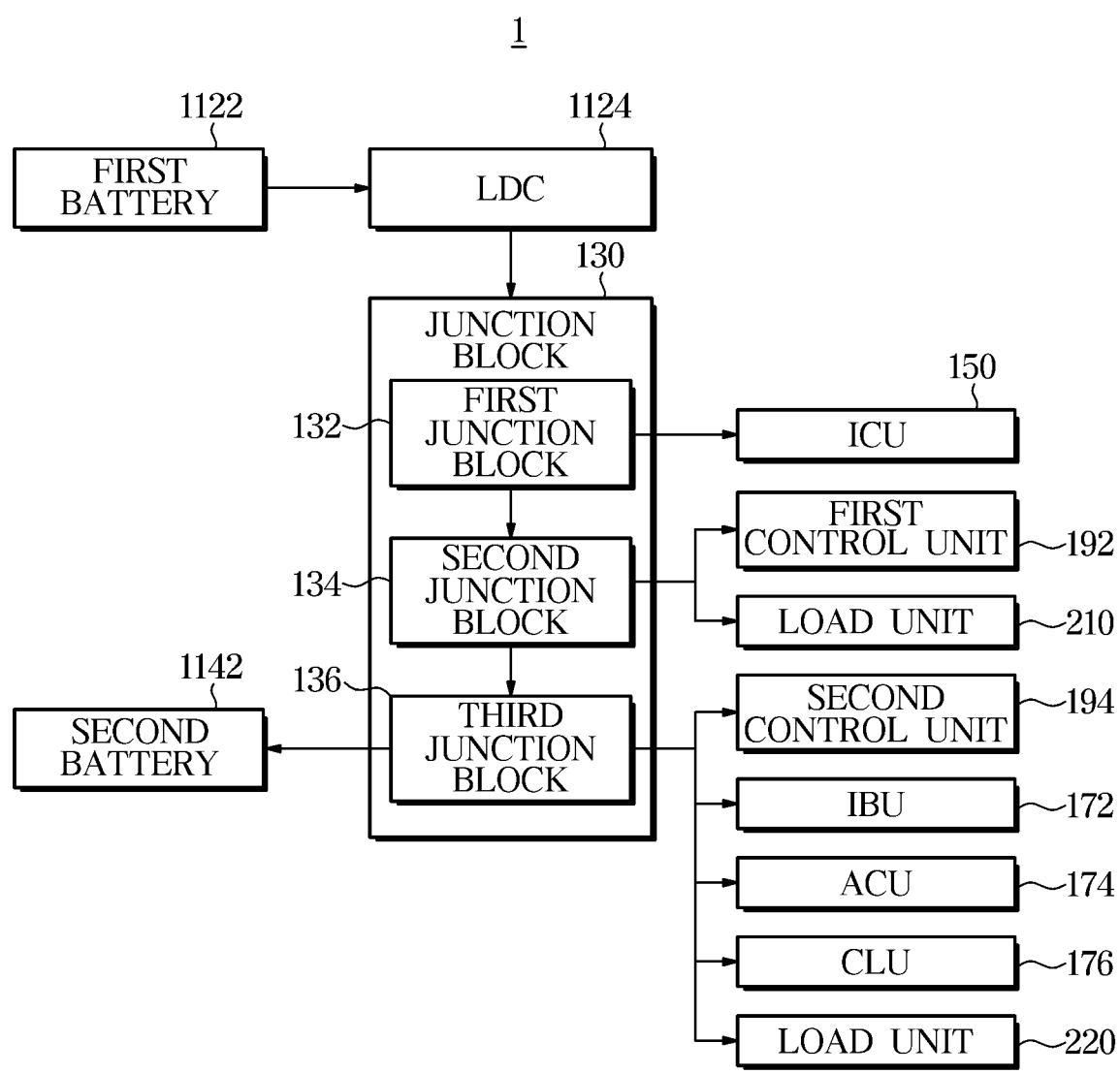

FIGS. 1 and 2 are control block diagrams of a vehicle 1 according to an embodiment.

Referring to FIG. 1, the vehicle 1 may include a power supplier 110, a junction block 130, an integrated central control unit (ICU) 150, a controller 170 and/or a control unit 190.

The power supplier 110 may supply power to each device of the vehicle 1 and include a main power supplier 112 and/or an auxiliary power supplier 114.

The main power supplier 112 may include a first battery 1122 of FIG. 2 and/or a low voltage DC-DC converter (LDC) 1124.

The first battery 1122 may store electric energy generated from an engine (not shown) of the vehicle 1 and provide electric energy to each of the devices of the vehicle 1. The first battery 1122 may receive and store electric energy from a generator (not shown) of the vehicle 1. For example, the generator of the vehicle 1 may convert kinetic energy of the engine into electric energy while the vehicle 1 is in motion.

The LDC 1124 may convert a voltage supplied from the first battery 1122 into a low voltage. Also, the LDC 1124 may be located inside an engine room of the vehicle 1.

Although not illustrated, the main power supplier 112 may further include a high voltage battery management system (H/V BMS). The H/V BMS may measure various factors such as a current, a voltage, and/or a temperature, etc., of the first battery 1122 through a sensor (e.g., a battery sensor) to identify and/or control charging and discharging states and the remaining amount of the first battery 1122.

The auxiliary power supplier 114 may include a second battery 1142 of FIG. 2.

The second battery 1142 may store electric energy supplied from the first battery 1122 and/or the generator of the vehicle 1. For example, the second battery 1142 may be 12V.

Meanwhile, although not illustrated, the auxiliary power supplier 114 may further include a low voltage battery management system (L/V BMS). The L/V BMS may measure various factors such as current, voltage, and/or temperature, etc., of the second battery 1142 through a sensor (e.g., a battery sensor) to identify and/or control charging and discharging states and the remaining amount of the second battery 1142.

The junction block 130 may provide power supplied from the generator and/or the power supplier 110 of the vehicle 1 to each of the devices of the vehicle 1.

Referring to FIG. 2, the junction block 130 may include a first junction block 132, a second junction block 134 and/or a third junction block 136.

The first junction block 132 (also referred to as a PE room junction block) may provide power to the ICU 150.

For example, power from the LDC 1124 may be provided to the ICU 150.

The second junction block 134 (also referred to as an autonomous vehicle junction block-A (AVJB-A)) may be electrically connected to the first junction block 132, and provide power to a first control unit 192 and/or a load unit 210.

Although not illustrated, the load unit 210 may include a load unit related to steering and/or braking for autonomous driving of the vehicle 1, a cognition determination sensor, and/or a communication gateway, and the like.

The third junction block 136 (also referred to as an AVJB-B) may be electrically connected to the second junction block 134, and provide power to a second control unit 194, the controller 170 such as an integrated body unit (IBU) 172, an airbag control unit (ACU) 174 and/or a cluster control unit (CLU) 176, etc., and/or a load unit 220.

Although not illustrated, the load unit 220 may include a load unit related to steering and/or braking for autonomous driving of the vehicle 1, a cognition determination sensor, and/or a communication gateway, and the like.

The ICU 150 may be provided with power of the power supplier 110 through the junction block 130.

A single or a plurality of controllers 170 may be provided, and the controller 170 may be supplied with power through the ICU 150. Also, the controller 170 may control at least one load unit of the vehicle 1.

The controller 170 may include the IBU 172, the ACU 174, the CLU 176, and the like, of FIG. 2.

The IBU 172 may be a control device integrating a body control module (BCM, not shown), a smart key system (SMK, not shown) and a tire pressure monitoring system (TPMS, not shown).

The BCM may perform controls of locking, exterior lamp, and/or wiper/washer of the vehicle 1. The BCM may also perform controls of vehicle security, parking assistance, warning about a seat belt and/or door opening, and the like, of the vehicle 1.

The SMK may recognize a smart key of the vehicle 1, and perform locking and unlocking of the vehicle 1. Also, the SMK may open a trunk of the vehicle 1 and allow the vehicle 1 to output a warning.

The TPMS may periodically collect tire pressure for monitoring and/or alerting.

The ACU 174 may control an operation of an airbag depending on an intensity of a collision applied to the vehicle 1.

The CLU 176 may control a cluster of the vehicle 1.

The control unit 190 may control an autonomous driving of the vehicle 1 and may be referred to as an autonomous driving control unit.

The control unit 190 may include the first control unit 192 and the second control unit 194 of FIG. 2.

Figure 3:
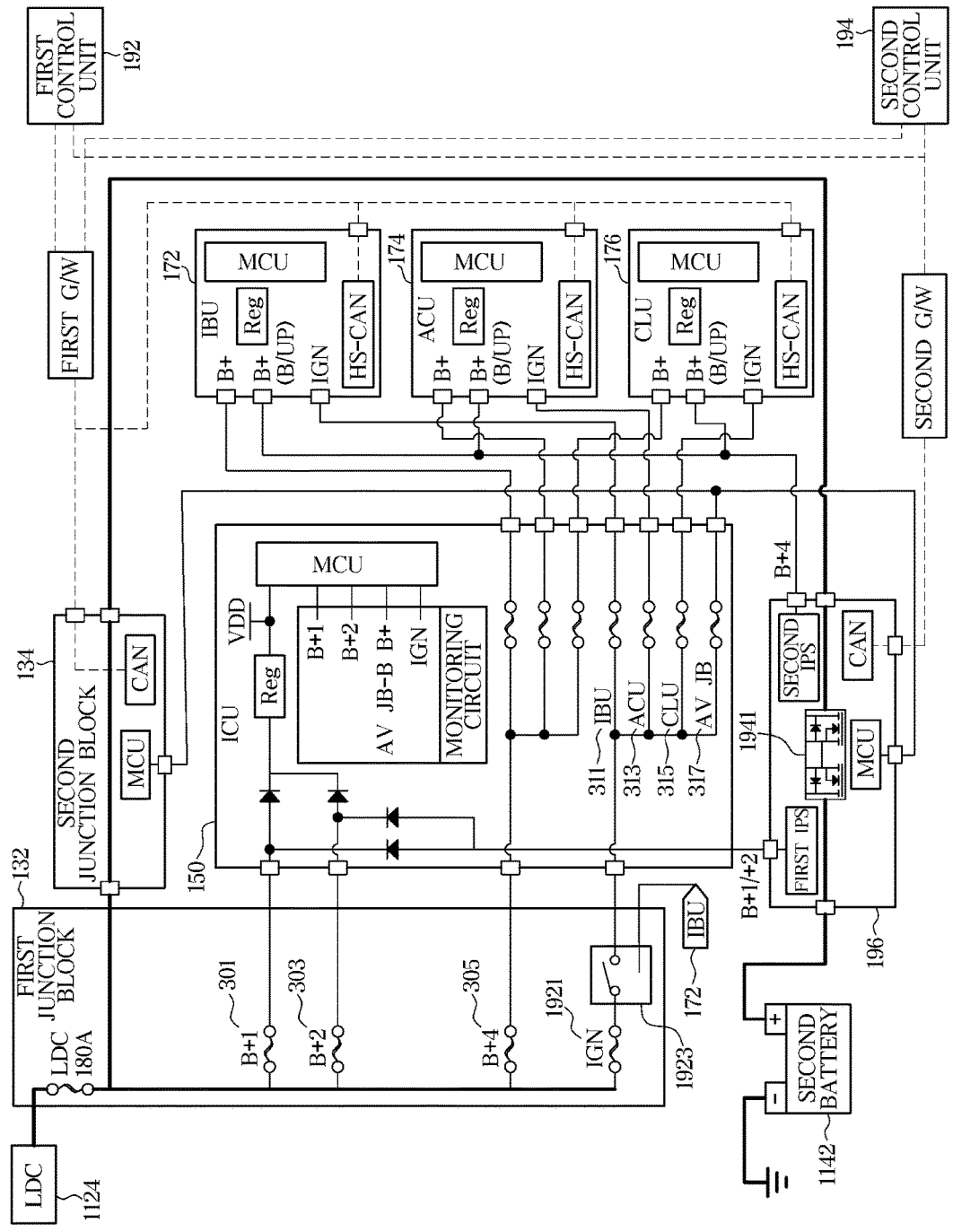
FIG. 3 is a circuit diagram of a vehicle according to an embodiment.

FIG. 3 is a circuit diagram of the vehicle 1 according to an embodiment.

Referring to FIG. 3, the first junction block 132 may be provided between the LDC 1124 and the second junction block 134, and be electrically connected to the LDC 1124 and the second junction block 134.

The third junction block 136 may be provided between the second battery 1142 and the second junction block 134, and be electrically connected to the second battery 1142 and the second junction block 134.

The third junction block 136 may include a switch 1941 (also referred to as a back to back switch), and the switch 1941 may be provided between the second battery 1142 and the second junction block 134.

When the switch 1941 is on, the second battery 1142 and the second junction block 134 are connected to each other, and thus the second battery 1142 and the LDC 1124 may be electrically connected to each other.

When the switch 1941 is off, the second battery 1142 and the second junction block 134 are separated from each other, and thus the second battery 1142 and the LDC 1124 may be electrically disconnected from each other.

The first junction block 132 may supply the power from the LDC 1124 to the ICU 150 as battery power B+1, B+2 and B+4 through internal battery fuses, i.e., a B+1 fuse 301, a B+2 fuse 303 and a B+4 fuse 305.

The first junction block 132 may supply the power from the LDC 1124 to the ICU 150 as ignition (IGN) power through an internal IGN fuse 1921 and a relay 1923.

The battery power B+4 may be supplied to each of the IBU 172, the ACU 174 and the CLU 176 through the ICU 150.

The IGN power may be supplied to the IBU 172 through an IBU fuse 311 of the ICU 150, to the ACU 174 through an ACU fuse 313 of the ICU 150, and to the CLU 176 through a CLU fuse 315 of the ICU 150.

Also, the IGN power may be supplied to the second junction block 134 and the third junction block 136 through an AV_JB fuse 1303 of the ICU 150.

Battery power B+ of the second battery 1142 may be supplied to each of the IBU 172, the ACU 174 and the CLU 176 through the third junction block 136. For example, the battery power B+ may be supplied to the IBU 172, the ACU 174 and the CLU 176 through a first intelligent power switch (IPS) of the third junction block 136.

In addition, the battery power B+1 and B+2 of the second battery 1142 may be supplied to the ICU 150 through the third junction block 136. For example, the battery power B+1 and B+2 of the second battery 1142 may be supplied to the ICU 150 through a second IPS of the third junction block 136.

The ICU 150 may include a monitoring circuit capable of monitoring power in the ICU 150, and the monitoring circuit may be included in a micro control unit (MCU) of the ICU 150 or be implemented separately from the MCU.

Further, each of the IBU 172, the ACU 174 and the CLU 176 may include a communication circuit (also referred to as a communication module) capable of performing communication such as a controller area network (CAN) between the MCU and constituent components (referred to as units or devices) of the vehicle 1.

Also, each of the second junction block 134 and the third junction block 136 may include a communication circuit (also referred to as a communication module) capable of performing communication such as a CAN between the MCU and constituent components (referred to as units or devices) of the vehicle 1.

Each of the first control unit 192 and/or the second control unit 194 may include a communication circuit (also referred to as a communication module) capable of performing communication such as a CAN between the MCU and constituent components (referred to as units or devices) of the vehicle 1.

The first control unit 192 may be communicatively connected to the second junction block 134, the IBU 172, the ACU 174, the CLU 176 and the second control unit 194, through a first gateway (first G/W).

The second control unit 194 may be communicatively connected to the third junction block 136 and the first control unit 192 through a second gateway (second G/W).

According to the above-described circuit of the vehicle 1 shown in FIG. 3, unlike the battery power B+1, B+2 and B+4, the IGN power may be distributed to the ICU 150 through the IGN fuse 1921 and the relay 1923 of the first junction block 132, and supplied to each of the controllers 170 through a secondary fuse again.

For example, the IGN power distributed to the ICU 150 may be supplied to the IBU 172 through the IBU fuse 311 of the ICU 150, to the ACU 174 through the ACU fuse 313 of the ICU 150, and to the CLU 176 through the CLU fuse 315 of the ICU 150.

The relay 1923 converts a battery power component into an IGN power component, and the SMK included in the IBU 172 may control a coil end of the relay 1923. When the SMK is not applied to a vehicle, a power component may be converted with a mechanical keyset.

According to FIGS. 1 to 3 described above, the vehicle 1 may have a main power grid and an auxiliary power grid through two power sources which are the LDC 1124 of the main power supplier 112 and the second battery 1142 of the auxiliary power supplier 114.

When power is normal, power may be stably supplied to each of the first control unit 192, the load unit 210, the second control unit 194, the IBU 172, the ACU 174, the CLU 176 and the load unit 220, etc., through the second junction block 134 and the switch 1941 of the third junction block 136.

However, when an error (short-circuit or disconnection) occurs in the main power supplier 112 or the auxiliary power supplier 114, the control unit 190 turns off the switch 1941 of the third junction block 136, thereby separating the main power supplier 112 from the auxiliary power supplier 114 in order to be prepared for an emergency through one power supply.

For instance, during autonomous driving of the vehicle 1, a failure of the IGN power in the first junction block 132 may cause a serious problem for the vehicle 1 and a driver. Accordingly, the vehicle 1 may make the IGN power redundant through hard wire and communication, and identify an IGN power failure and a location of the IGN power failure, i.e., a device causing the IGN power failure, by sensing and comparing the IGN power in the ICU 150, the second junction block 134, the third junction block 136, the first control unit 192, the second control unit 194 and/or the controller 170.

Figure 4:
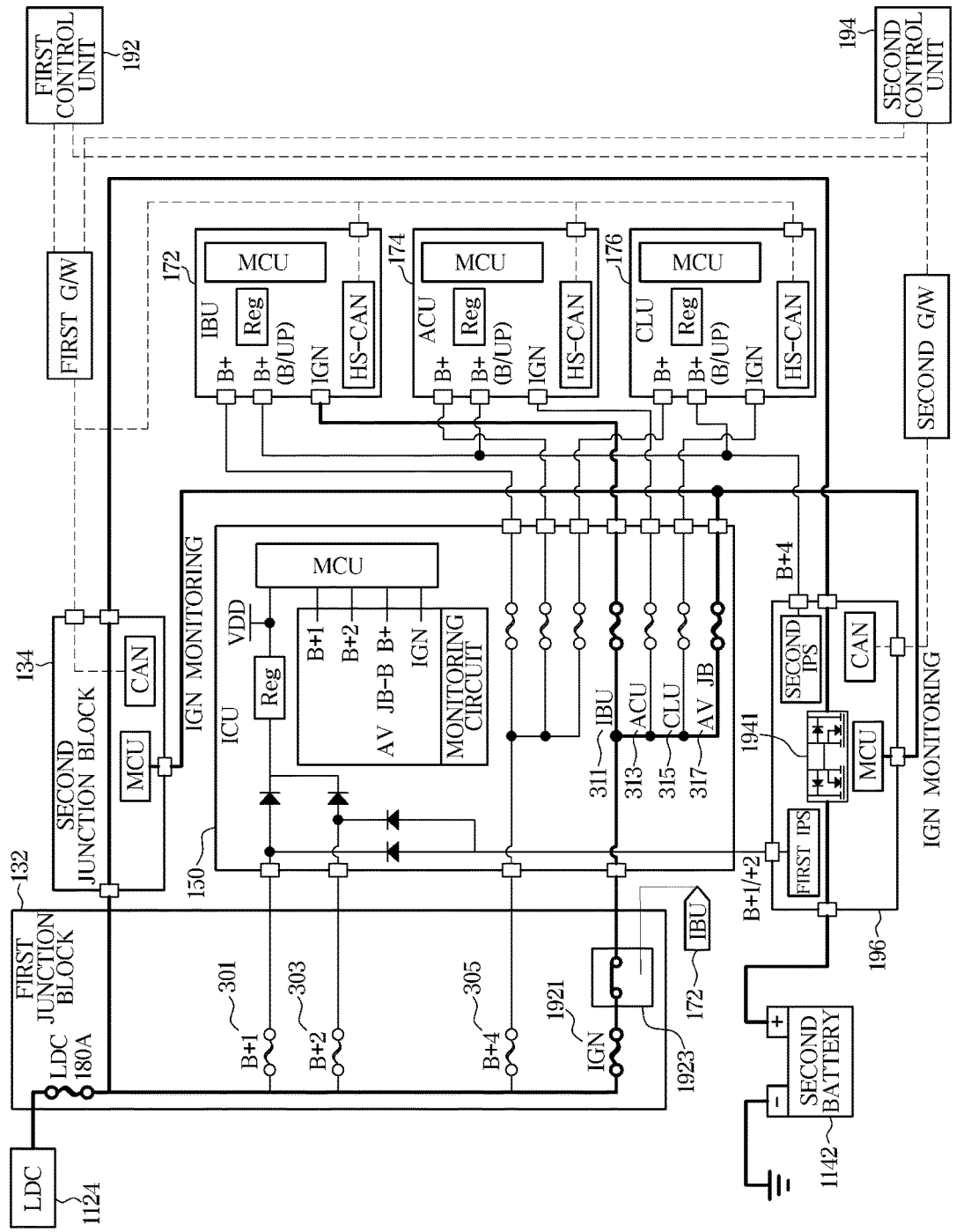
FIG. 4 is a circuit diagram illustrating a control operation of a control unit of a vehicle according to an embodiment.
Figure 5:
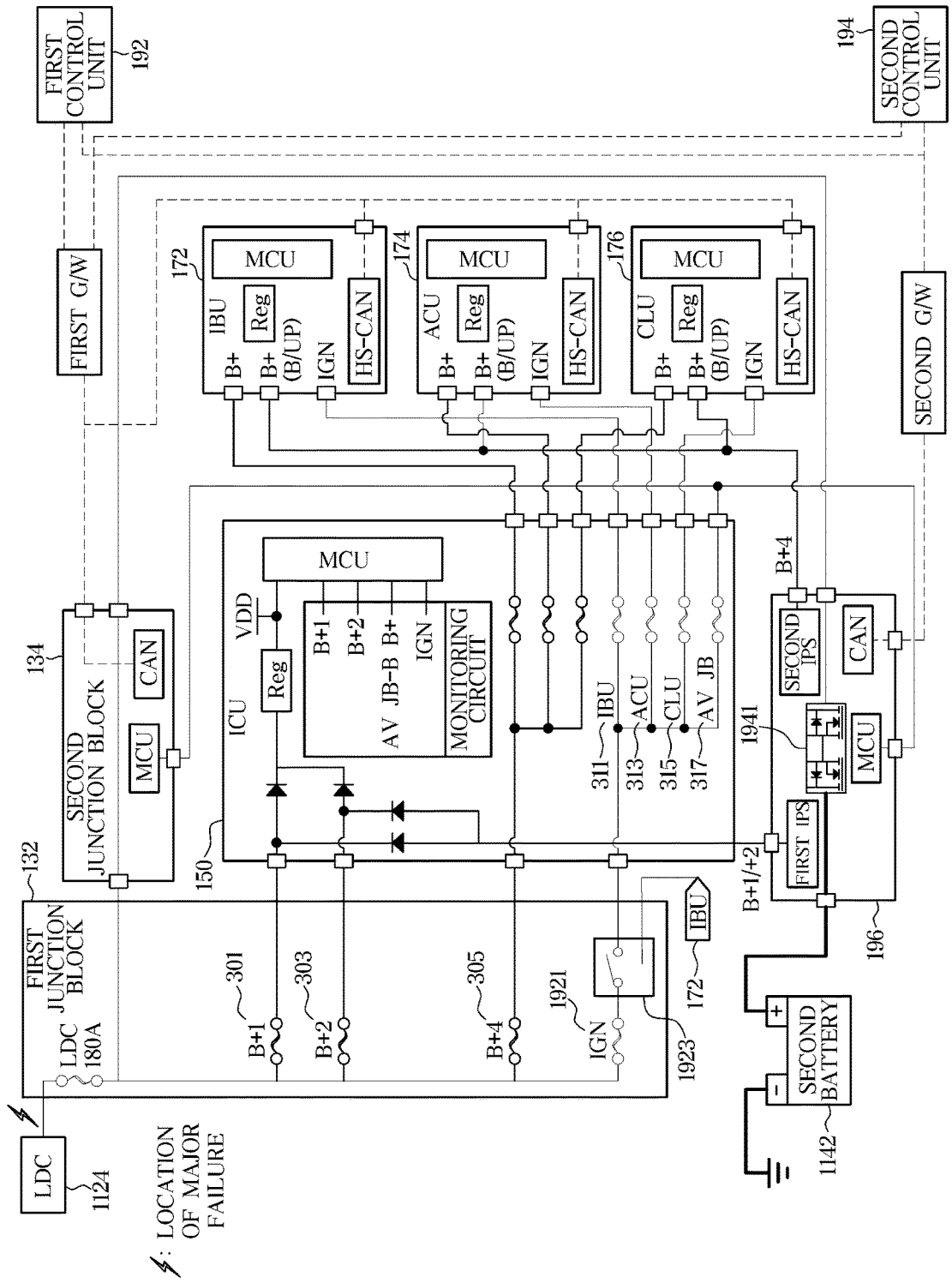
FIGS. 5 and 6 are diagrams illustrating power supply states depending on locations of power failure of a vehicle according to an embodiment.
Figure 6:
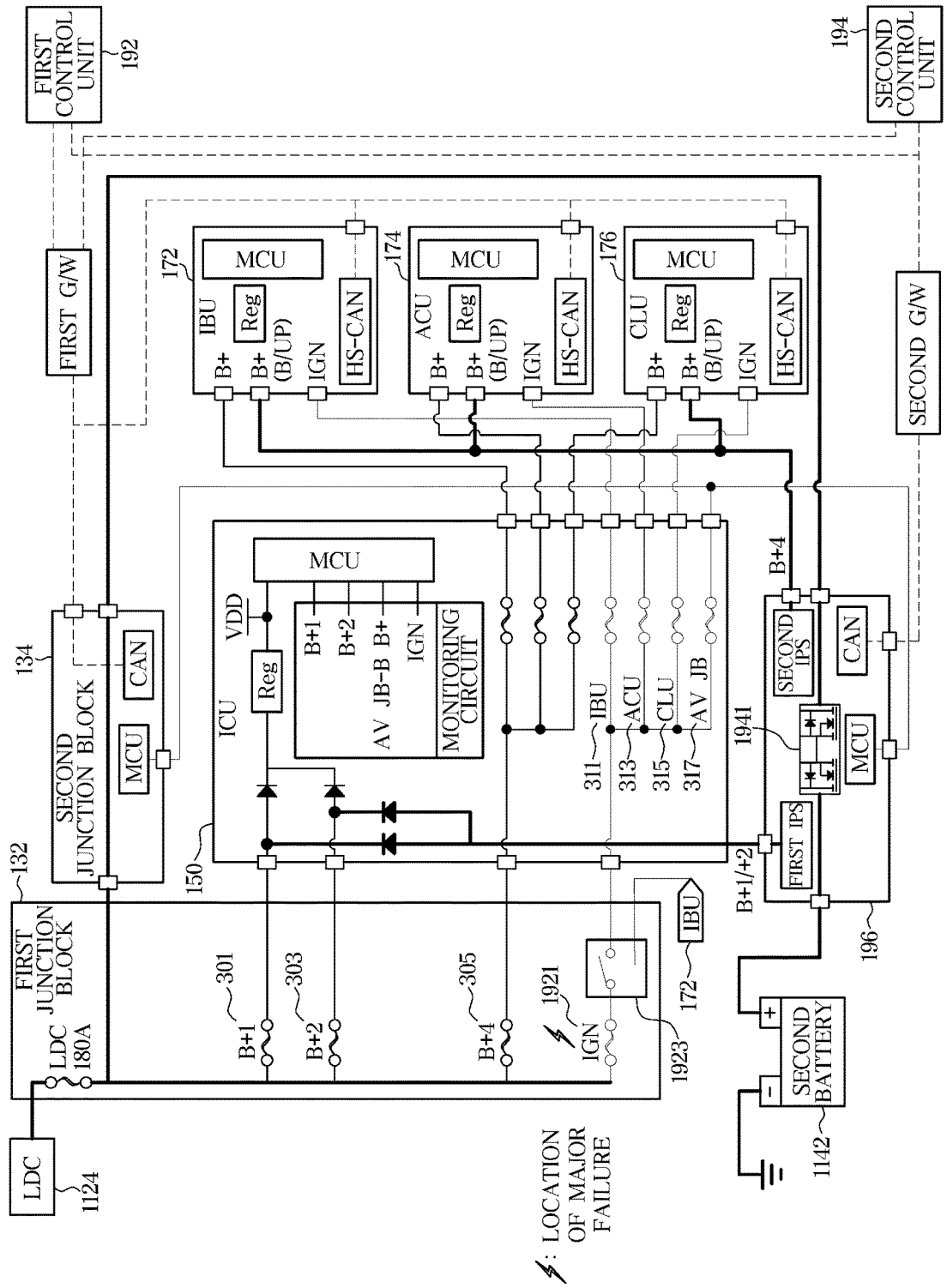

FIG. 4 is a circuit diagram illustrating a control operation of the control unit 190 of the vehicle 1 according to an embodiment. FIGS. 5 and 6 are diagrams illustrating power supply states depending on locations of power failure of the vehicle 1 according to an embodiment.

Referring to FIG. 4, the vehicle 1 may identify a power failure and a location of the power failure due to an error of IGN power during autonomous driving of the vehicle 1.

Power from the LDC 1124 of the vehicle 1, e.g., a 12V power, may be supplied to the IBU 172 as IGN power through the IGN fuse 1921 of the first junction block 132 and the IBU fuse 311 of the ICU 150.

The LDC 1124 may monitor the IGN power, i.e., IGN power supply.

Also, the IGN power may be supplied to the second junction block 134 and the third junction block 136 through an AV_JB fuse 317 of the ICU 150.

Each of the ICU 150, the second junction block 134, the third junction block 136 and/or the IBU 172 may monitor the IGN power.

The control unit 190 of the vehicle 1, i.e., the first control unit 192 and/or the second control unit 194, may identify whether a failure occurs in the LDC 1124, the IGN fuse 1921 of the first junction block 132, the IBU fuse 311 of the ICU 150, or the AV_JB fuse 317 of the ICU 150, based on monitoring of the IGN power of each load unit of the vehicle 1.

According to an embodiment, when an error of IGN power is detected during autonomous driving of the vehicle 1, the first control unit 192 and/or the second control unit 194 may maintain an on state of the switch 1941 of the third junction block 136 or turn off the switch 1941, based on the monitoring result of the ICU 150, the second junction block 134, the third junction block 136 and/or the IBU 172.

For example, the first control unit 192 and/or the second control unit 194 may change the switch 1941 of the third junction block 136 from the on state to the off state, based on a cause of power failure of the vehicle 1, i.e., a location of the power failure of the vehicle 1.

When the switch 1941 is changed to the off state, it is considered that the vehicle 1 has a serious error, and the first control unit 192 and/or the second control unit 194 may control the vehicle 1 to operate with only one power source.

Also, the first control unit 192 and/or the second control unit 194 may change from an autonomous driving mode for autonomous driving of the vehicle 1 to a driver control mode, so that the driver may control the vehicle 1 directly.

For instance, the first control unit 192 and/or the second control unit 194 may enable the driver to drive the vehicle 1 by outputting information about the location of the power failure of the vehicle 1 together with information indicating that an operation mode is required to be changed.

Accordingly, the driver may drive the vehicle 1 to a nearby auto repair shop for diagnosis of the power failure of the vehicle 1.

Meanwhile, when the on state of the switch 1941 is maintained, the first control unit 192 and/or the second control unit 194 may output the information about the location of the power failure of the vehicle 1 so that the driver recognizes the failure.

According to the embodiments of FIGS. 1 to 4, the control unit 190 may receive power monitoring information of each of the ICU 150, the junction block 130 and the controller 170 during autonomous driving of the vehicle 1.

For example, the control unit 190 of the vehicle 1 may further include a communication circuit to receive the power monitoring information of each of the ICU 150, the junction block 130 and the controller 170 during autonomous driving of the vehicle 1.

The control unit 190 may identify where the power failure occurs in the vehicle 1 and determine a power supply method of the junction block 130 based on the power monitoring information and predetermined condition information.

For instance, the control unit 190 may identify at least one of the power supplier 110, the ICU 150 and the controller 170, as a device causing the power failure, i.e., a location of the power failure of the vehicle 1, and change the power supply method of the junction block 130.

The predetermined condition information may include power supply state information and power supply method information of each load unit corresponding to each of a plurality of pieces of power failure location information.

The predetermined condition information may include corresponding power failure location information, depending on whether a current of battery power of the ICU 150, a current of the IGN power of the ICU 150, a current of the IGN power of the second junction block 134, a current of the IGN power of the third junction block 136, and a current of the IGN power of the controller 170 such as the IBU 172 are identified.

Also, the predetermined condition information may include information about power output execution or power output cutoff of the auxiliary power supplier 114 such as the second battery 1142 and information about on or off control of the switch 1941 of the third junction block 136 corresponding to each of the corresponding power failure location information.

Referring to FIG. 5, when the power failure occurs in the LDC 1124, the current of each of the battery power B+1 and B+2 of the ICU 150, the IGN power of the ICU 150, the IGN power of the second junction block 134, the IGN power of the third junction block 136, and the IGN power of the IBU 172 may not be detected.

Referring to FIG. 6, when the power failure occurs in the first junction block 132, the current of each of the IGN power of the ICU 150, the IGN power of the second junction block 134, the IGN power of the third junction block 136, and the IGN power of the IBU 172 may not be detected.

The vehicle 1 may previously designate and store conditions related to the power failure of the vehicle 1 shown in FIGS. 6 and 7 as the condition information shown in Table 1 below. Referring to Table 1, the information about on or off control of the switch 1941 and information about control of power output execution or power output cutoff of the second battery 1142, depending on whether the current of the power of each of the units of the vehicle 1 is checked, may be previously designated in the vehicle 1 as the condition information.

TABLE 1

| | No | | | | |
|---|---|---|---|---|---|
| | 1 | 2 | 3 | 4 | 5 |
| Switch 1941 | off | on | on | on | on |
| Second battery 1142: power output | On (power output execution) | Off (power cutoff) | off | off | off |
| ICU 150: B + 1 | X (current not checked) | ○ (current checked) | ○ | ○ | ○ |
| ICU 150: B + 2 | X | ○ | ○ | ○ | ○ |
| ICU 150: IGN | X | X | ○ | ○ | ○ |
| Second junction block 134: IGN | X | X | X | ○ | X |
| Third junction block 136: IGN | X | X | X | ○ | X |
| IBU 172: IGN | X | X | X | X | ○ |
| Failure details | Failure of LDC 1124 | Failure of IGN fuse 1921 of first junction block 132, and relay 1923 Failure of input wire of ICU 150 | Failure of IBU fuse 311 and AV_JB fuse 317 of ICU 150, Failure of output wire of ICU 150, Failure of connector of second junction block 134 and/or third junction block 136 | Failure of IBU fuse 311 of ICU 150, Failure of output wire of ICU 150 | Failure of AV_JB fuse 317 of ICU 150, Failure of output wire of ICU 150 |

Also, the control unit 190 may identify whether power of each of the units of the vehicle 1 is a low voltage or a high voltage.

For example, when the power of each of the units of the vehicle 1 is greater than a predetermined reference voltage, the control unit 190 may determine as the high voltage, and when the power of each of the units of the vehicle 1 is less than or equal to the predetermined reference voltage, the control unit 190 may determine as the low voltage.

Figure 7:
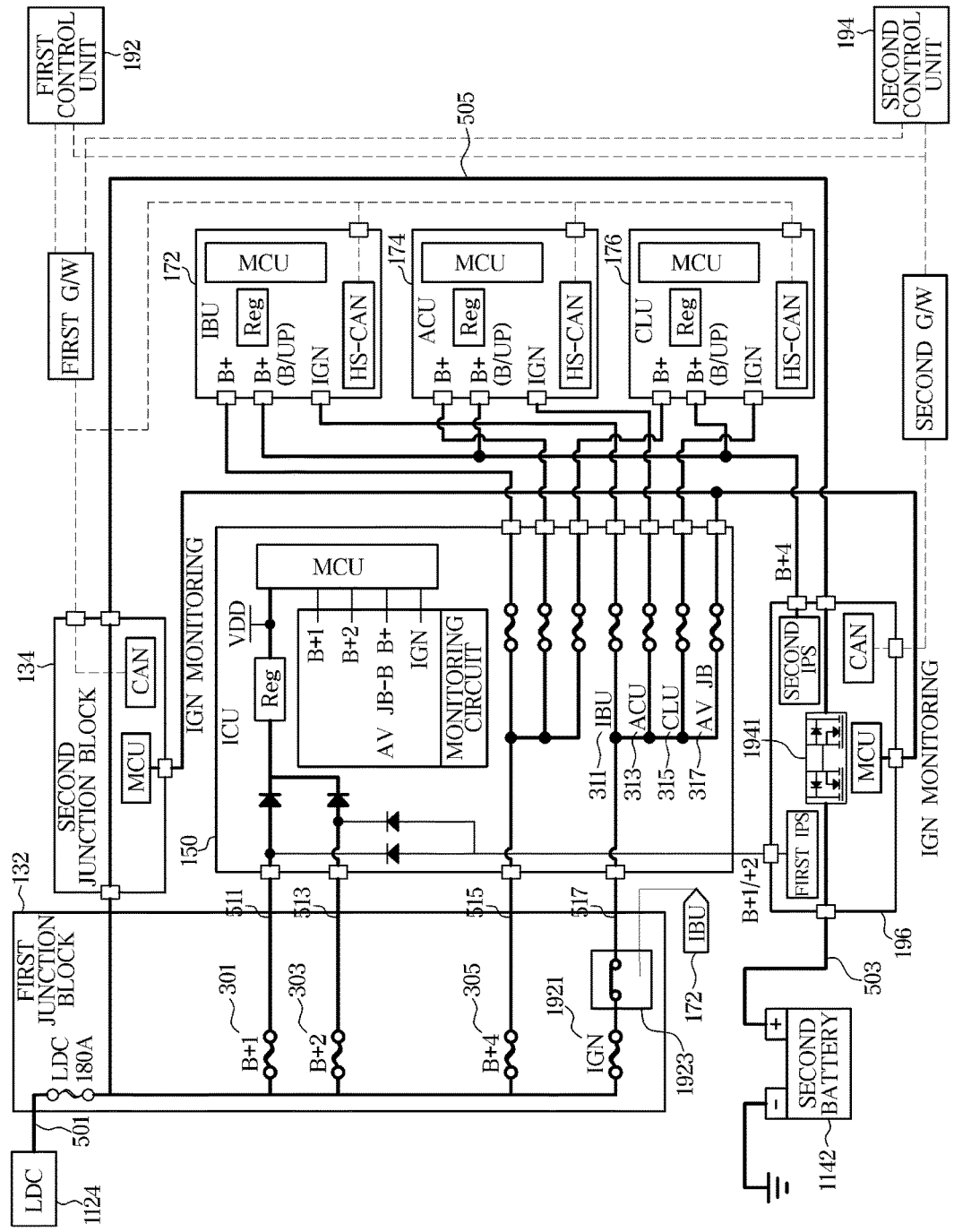
FIG. 7 is a circuit diagram illustrating a control operation of a control unit of a vehicle according to an embodiment.

FIG. 7 is a circuit diagram illustrating a control operation of the control unit 190 of the vehicle 1 according to an embodiment.

Referring to FIG. 7, the vehicle 1 may identify a power failure and a location of the power failure, i.e., a device causing the power failure, due to an error in IGN power and overall power during autonomous driving.

During autonomous driving of the vehicle 1, each of the second junction block 134, the third junction block 136, the ICU 150, the IBU 172, the ACU 174, and the CLU 176 monitors each power supply in order to identify the power failure of the vehicle 1.

The control unit 190 of the vehicle 1, i.e., the first control unit 192 and/or the second control unit 194, may identify a cause of the power failure including the location of the power failure by synthesizing the monitoring results of each of the second junction block 134, the third junction block 136, the ICU 150, the IBU 172, the ACU 174, and the CLU 176.

For example, the cause of the power failure of the vehicle 1 may include a failure of each of the LDC 1124, the second battery 1142, the first junction block 132 and the ICU 150 itself, and a loss of function of the LDC 1124 and/or the second battery 1142 due to a short circuit of a wire 501 connecting the LDC 1124 and the first junction block 132, a wire 503 connecting the second battery 1142 and the third junction block 136 and/or a wire 505 connecting the second junction block 134 and the third junction block 136.

Also, the cause of the power failure of the vehicle 1 may include a loss of function of the B+1 fuse 301, the B+2 fuse 303, the B+4 fuse 305 and/or the IGN fuse 1921, due to a short circuit of a first wire 511, a second wire 513, a third wire 515 and/or a fourth wire 517 connecting the first junction block 132 and the ICU 150.

The first control unit 192 and/or the second control unit 194 may provide a measure against the power failure of the vehicle 1 based on the identification of the cause of the power failure, i.e., where the power failure occurs.

For instance, the first control unit 192 and/or the second control unit 194 may enable the driver to drive the vehicle 1 directly by outputting a warning about the power failure and/or changing from an autonomous driving mode to a driver control mode.

For example, the output of the warning about the power failure may include output of information about the cause of the power failure.

Figure 8:
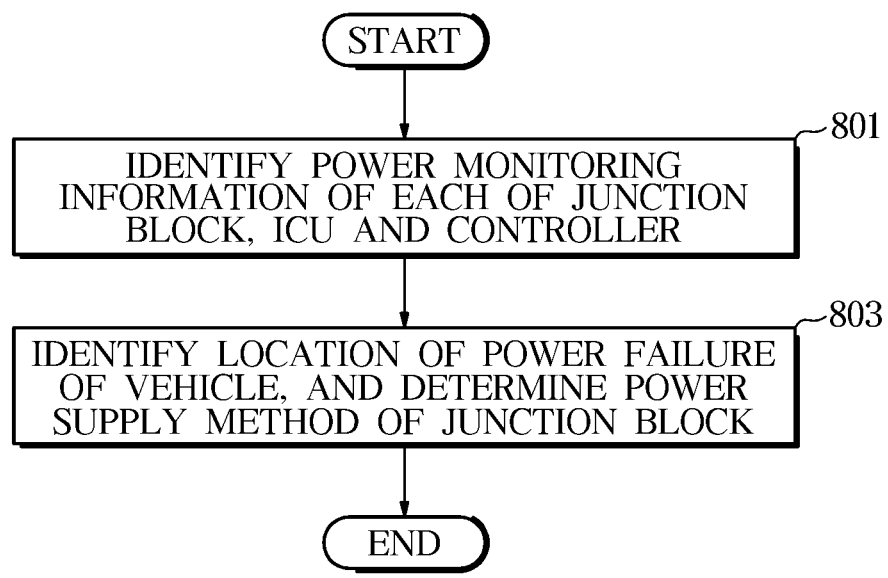
FIG. 8 is a flowchart illustrating operations of a control unit of a vehicle according to an embodiment.

FIG. 8 is a flowchart illustrating operations of the control unit 190 of the vehicle 1 according to an embodiment.

The control unit 190 of the vehicle 1 may identify power monitoring information of each of the junction block 130, the ICU 150 and the controller 170 of the vehicle 1 during autonomous driving of the vehicle 1 (801).

For instance, during autonomous driving of the vehicle 1, the junction block 130, the ICU 150 and the controller 170 of the vehicle 1 may monitor a power of the junction block 130, the ICU 150 and the controller 170, respectively, and output the power monitoring information. The control unit 190 may receive the power monitoring information from each of the junction block 130, the ICU 150 and the controller 170 through a communication circuit, and perform identification.

For example, the power monitoring information of the ICU 150 may include monitoring information of battery power and IGN power of the ICU 150. Also, the power monitoring information of the junction block 130 may include monitoring information of IGN power of the second junction block 134, and the power monitoring information of the controller 170 may include monitoring information of IGN power of the controller 170.

The control unit 190 may identify a location of power failure of the vehicle 1 based on the power monitoring information and predetermined condition information, and determine a power supply method of the junction block 130 (803).

The predetermined condition information may include power supply state information and power supply method information of each load unit corresponding to each of a plurality of pieces of power failure location information.

For example, the control unit 190 may identify at least one of the power supplier 110, the ICU 150 and the controller 170, as a device causing the power failure, and change a power supply method of the junction block 130.

The control unit 190 may control the switch 1941 to electrically disconnect the LDC 1124 which is the main power supplier 112 and the second battery 1142 which is the auxiliary power supplier 114 from each other based on the power failure location, and may control so that power is supplied through one of the main power supplier 112 and the auxiliary power supplier 114, based on the control of the switch 1941.

For example, when the main power supplier 112, e.g., the LDC 1124, is included in the location of power failure, the control unit 190 may control the switch 1941 to electrically disconnect the LDC 1124 which is the main power supplier 112 and the second battery 1142 which is the auxiliary power supplier 114 from each other, and control so that power is supplied through the auxiliary power supplier 114 only, based on the control of the switch 1941.

In addition to the above-described embodiment of FIG. 8, when the main power supplier 112 is included in the location of power failure, the control unit 190 may release an autonomous driving mode for autonomous driving. Also, the control unit 190 may output a first warning message through an output device including a speaker and/or a display, etc., and/or through a control of a communication circuit.

Also, when the junction block 130, the ICU 150 and/or the controller 170 are included in the location of power failure, the control unit 190 may output a second warning message.

Alternatively, in addition to the above-described embodiment of FIG. 8, when the main power supplier 112 is included in the location of power failure, the control unit 190 may output a warning message.

In response to the output of the warning message, when a user operation for releasing the autonomous driving mode is received within a preset period of time through an input device of the vehicle 1 and/or the communication circuit, the control unit 190 may terminate a control for autonomous driving. Also, when the user operation for releasing the autonomous driving mode is not received within the preset period of time, the control unit 190 may control the vehicle 1 to pull over onto a side of a road or head to an auto repair shop located within a predetermined distance.

Figure 9:
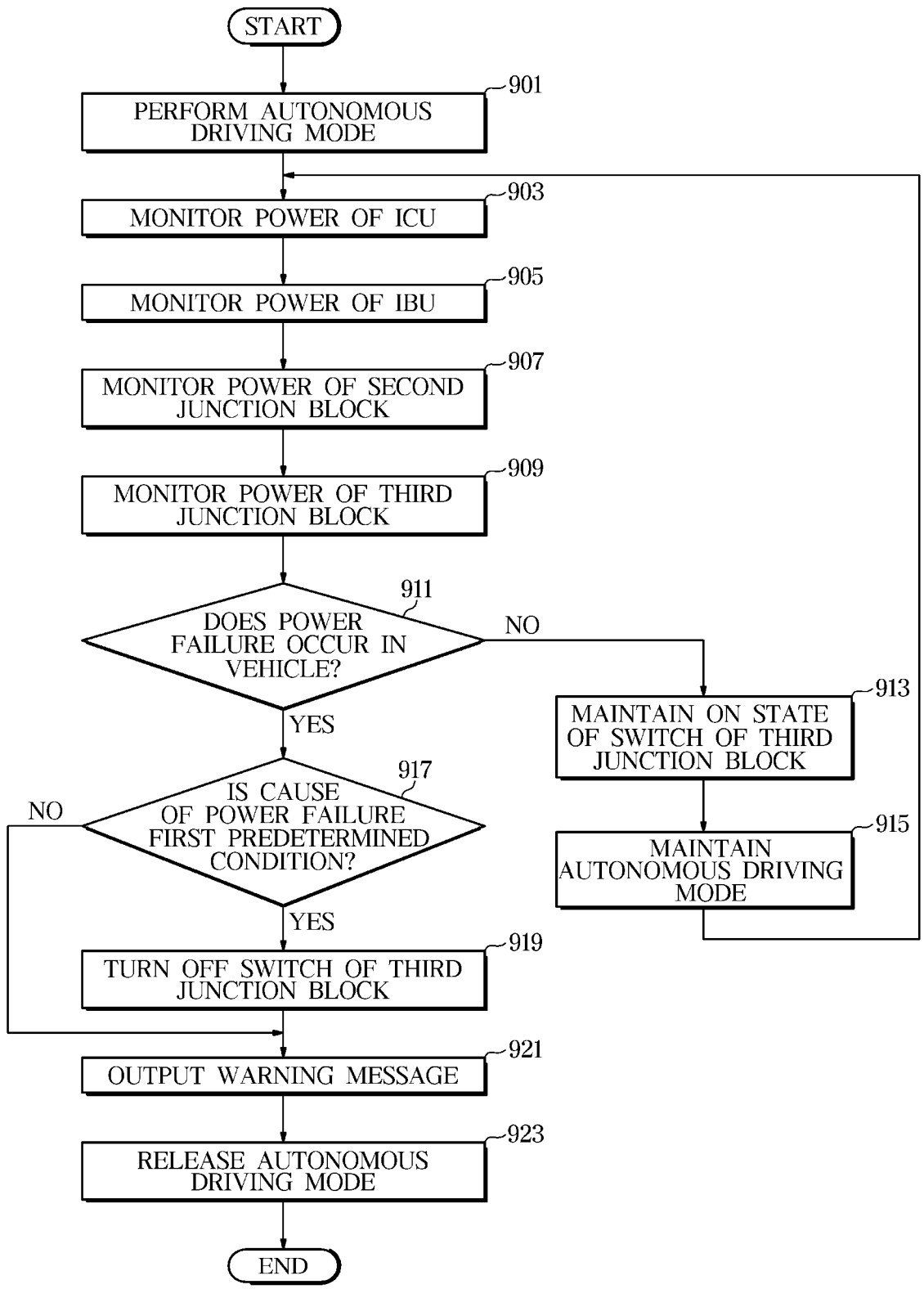
FIG. 9 is a flowchart illustrating operations of a vehicle according to an embodiment.

FIG. 9 is a flowchart illustrating operations of the vehicle 1 according to an embodiment.

The control unit 190 of the vehicle 1 may perform an autonomous driving mode (901).

The ICU 150 of the vehicle 1 may monitor power of the ICU 150 during autonomous driving of the vehicle 1 according to the autonomous driving mode (903).

The IBU 172 of the vehicle 1 may monitor power of the IBU 172 during autonomous driving of the vehicle 1 (905).

The second junction block 134 of the vehicle 1 may monitor power of the second junction block 134 during autonomous driving of the vehicle 1 (907).

The third junction block 136 of the vehicle 1 may monitor power of the third junction block 136 during autonomous driving of the vehicle 1 (909).

The control unit 190 of the vehicle 1 may identify whether a power failure occurs in the vehicle 1, based on power monitoring information of each load unit such as the ICU 150, the IBU 172, the second junction block 134 and the third junction block 136 (911).

For example, the control unit 190 of the vehicle 1 may receive the power monitoring information of each of the units of the vehicle 1 through a communication circuit, and identify whether the power failure occurs in the vehicle 1, based on the power monitoring information of each of the units.

When the power failure occurs in the vehicle 1, the control unit 190 may perform an operation 917. Otherwise, the control unit 190 may perform an operation 913.

When the power failure does not occur in the vehicle (NO to 911), the control unit 190 may maintain an on state of the switch 1941 of the third junction block 136 (913).

The control unit 190 may maintain the autonomous driving mode (915).

The control unit 190 may keep performing autonomous driving in the autonomous driving mode based on maintaining the on state of the switch 1941 of the third junction block 136.

When the power failure occurs in the vehicle 1 (YES to 911), the control unit 190 may identify whether a cause of the power failure is a first predetermined condition, based on comparing the power monitoring information of each of the units of the vehicle 1 and predetermined condition information (917).

The predetermined condition information may include power supply state information and power supply method information of each of the units corresponding to each of a plurality of pieces of power failure location information.

When the cause of the power failure is the first predetermined condition, the control unit 190 may perform an operation 919. Otherwise, the control unit 190 may perform an operation 921.

The first predetermined condition may include the condition of No. 1 in Table 1 above.

When the cause of the power failure is the first predetermined condition (YES to 917), the control unit 190 may turn off the switch 1941 of the third junction block 136 (919).

The control unit 190 may output a warning message in response to the cause of the power failure not being the first predetermined condition (NO to 917) or in response to the operation 919 (921).

The control unit 190 may output the warning message related to the power failure through an output device of the vehicle 1 such as a speaker and/or a display, and the like.

In response to the output of the warning message, the control unit 190 may release the autonomous driving mode (923).

The autonomous driving mode may be switched to a driver control mode that a driver directly drives the vehicle 1 according to the release of the autonomous driving mode.

Therefore, the driver may pull over onto a side of a road or head to a nearby auto repair shop.

According to the above-described embodiment of FIG. 9, as the autonomous driving of the vehicle 1 starts, each of the units of the vehicle 1 may monitor whether power is normally supplied. When an error corresponding to one of the conditions No. 1 to No. 5 of Table 1 above is detected while monitoring power of each of the units, for example, the ICU 150, the IBU 172, the second junction block 134 and the third junction block 136, the control unit 190 may share the error with each of the units of the vehicle 1 such as the third junction block 136, the IBU 172 and the CLU 176. Also, the control unit 190 may transmit related information through the communication circuit, so that IGN power of the second battery 1142 may be supplied to a unit that requires the IGN power, such as the third junction block 136, the IBU 172, the CLU 176, etc., and an IGN signal may be provided to the device that requires the IGN power.

Afterwards, the control unit 190 may output the warning message so that the driver recognizes the power failure of the vehicle 1, and release the autonomous driving mode to enable the driver to directly drive the vehicle 1.

Also, the condition No. 1 described above indicates a condition of failure of the LDC 1124, and the failure of the LDC 1124 may include a failure caused by a short circuit (or disconnection) of the LDC 1124. Such failure of the LDC 1124 may be the most dangerous failure in autonomous driving, and when the failure of the LDC 1124 is identified, the control unit 190 may turn off the switch 1941 of the third junction block 136, thereby electrically disconnecting the LDC 1124 and the second battery 1142 from each other.

Meanwhile, it has been described in the above-described embodiment of FIG. 9 that the control unit 190 automatically releases the autonomous driving mode. However, according to another embodiment, information for releasing the autonomous driving mode may be included in the warning message, so that a user may directly release the autonomous driving mode. When a user operation for releasing the autonomous driving mode is not received within a predetermined period of time after outputting the warning message, the control unit 190 may determine that the user, i.e., the driver, is not present, pull over onto the side of the road through autonomous driving, and then output a warning message about an emergency again.

As is apparent from the above, according to the embodiments of the disclosure, the vehicle and the control method thereof can identify a failure of an ignition power of the vehicle and where the failure occurs.

For example, during autonomous driving of the vehicle, the vehicle and the control method thereof can automatically detect a failure of ignition power, identify an exact location of a cause of the failure, notify a driver of a dangerous situation, and secure the safety of the vehicle through power control, and thereby can prevent an accident caused by the failure of the ignition power.

For example, the vehicle and the control method thereof can provide a measure by detecting a malfunction of each load unit of the vehicle such as a junction block, a fuse in an integrated control unit, etc., and thereby can improve the safety of power supply during autonomous driving of the vehicle.

Embodiments can thus be implemented through computer readable code/instructions in/on a medium, e.g., a computer readable medium, to control at least one processing element to implement any above described exemplary embodiment.

The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording mediums.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle comprising:
a power supplier;
a junction block configured to supply power from the power supplier;
an integrated central control unit configured to receive the power from the junction block;
a controller configured to receive the power through the integrated central control unit and to control at least one load unit of the vehicle; and
a control unit configured to identify a power failure location of the vehicle and to determine a power supply method of the junction block during an autonomous driving of the vehicle, based on power monitoring information of each of the integrated central control unit, the junction block, and the controller and predetermined condition information, the predetermined condition information comprising power supply state information and power supply method information of each load unit corresponding to each of a plurality of pieces of power failure location information;
wherein the power supplier includes a main power supplier and an auxiliary power supplier;
wherein the junction block comprises a switch configured to electrically connect or disconnect the main power supplier and the auxiliary power supplier; and
wherein the control unit is further configured to control the switch to electrically disconnect the main power supplier and the auxiliary power supplier from each other based on the power failure location;
wherein control so that the power is supplied through one of the main power supplier and the auxiliary power supplier, based on the control of the switch to electrically disconnect the main power supplier and the auxiliary power supplier from each other;
wherein the junction block further comprises a first junction block configured to supply the power to the integrated central control unit and a second junction block and a third junction block configured to receive the power from the integrated central control unit;
wherein the first junction block is provided between the main power supplier and the second junction block;
wherein the third junction block comprises the switch; and
wherein the switch is provided between the auxiliary power supplier and the second junction block.

2. The vehicle of claim 1, wherein, in response to the main power supplier being included in the power failure location, the control unit is configured to:
control the switch to electrically disconnect the main power supplier and the auxiliary power supplier from each other; and control so that the power is supplied through the auxiliary power supplier, based on the control of the switch to electrically disconnect the main power supplier and the auxiliary power supplier from each other.

3. The vehicle of claim 1, wherein the power monitoring information of each of the integrated central control unit, the junction block and the controller comprises monitoring information of a battery power and an ignition power of the integrated central control unit, monitoring information of an ignition power of the second junction block, monitoring information of an ignition power of the third junction block, and monitoring information of an ignition power of the controller.

4. The vehicle of claim 3, wherein the predetermined condition information comprises corresponding power failure location information, depending on whether a current of the battery power of the integrated central control unit, a current of the ignition power of the integrated central control unit, a current of the ignition power of the second junction block, a current of the ignition power of the third junction block, and a current of the ignition power of the controller are identified.

5. The vehicle of claim 4, wherein the predetermined condition information comprises information about power output execution or power output cutoff of the auxiliary power supplier and information about on or off control of the switch corresponding to each of the corresponding power failure location information.

6. The vehicle of claim 1, wherein the control unit is further configured to release an autonomous driving mode for the autonomous driving and to output a warning message, in response to the main power supplier being included in the power failure location.

7. The vehicle of claim 6, wherein the control unit is further configured to output the warning message, in response to at least one of the junction block, the integrated central control unit or the controller being included in the power failure location.

8. The vehicle of claim 1, wherein the control unit is further configured to:
output a warning message in response to the main power supplier being included in the power failure location; and
terminate a control for the autonomous driving in response to a user operation for releasing an autonomous driving mode for the autonomous driving being received within a preset period of time in response to the output of the warning message; or
control the vehicle to pull over onto a side of a road or control the vehicle to head to an auto repair shop within a predetermined distance range in response to the user operation not being received within the preset period of time.

9. A control method of a vehicle, the control method comprising:
during an autonomous driving of the vehicle, identifying power monitoring information of each of a junction block that supplies power of a power supplier, an integrated central control unit that receives the power from the junction block, and a controller that receives the power through the integrated central control unit and controls at least one load unit of the vehicle; and
identifying a power failure location of the vehicle and determining a power supply method of the junction block, based on the power monitoring information and predetermined condition information, the predetermined condition information comprising power supply state information and power supply method information of each load unit corresponding to each of a plurality of pieces of power failure location information,
wherein the power supplier includes a main power supplier and an auxiliary power supplier;
wherein the junction block comprises a switch that electrically connects or disconnects the main power supplier and the auxiliary power supplier;
wherein determining the power supply method of the junction block includes:
controlling the switch to electrically disconnect the main power supplier and the auxiliary power supplier from each other based on the power failure location; and
controlling so that the power is supplied through one of the main power supplier and the auxiliary power supplier, based on controlling the switch to electrically disconnect the main power supplier and the auxiliary power supplier from each other;
wherein the junction block comprises a first junction block that supplies the power to the integrated central control unit and a second junction block and a third junction block that receive the power from the integrated central control unit;
wherein the first junction block is provided between the main power supplier and the second junction block;
wherein the third junction block comprises the switch; and
wherein the switch is provided between the auxiliary power supplier and the second junction block.

10. The control method of claim 9, wherein, when the main power supplier is included in the power failure location, determining the power supply method of the junction block comprises:
controlling the switch to electrically disconnect the main power supplier and the auxiliary power supplier from each other; and
controlling so that the power is supplied through the auxiliary power supplier, based on controlling the switch to electrically disconnect the main power supplier and the auxiliary power supplier from each other.

11. The control method of claim 9, wherein the power monitoring information of each of the integrated central control unit, the junction block and the controller comprises monitoring information of a battery power and an ignition power of the integrated central control unit, monitoring information of an ignition power of the second junction block, monitoring information of an ignition power of the third junction block, and monitoring information of an ignition power of the controller.

12. The control method of claim 11, wherein the predetermined condition information comprises corresponding power failure location information, depending on whether a current of the battery power of the integrated central control unit, a current of the ignition power of the integrated central control unit, a current of the ignition power of the second junction block, a current of the ignition power of the third junction block, and a current of the ignition power of the controller are identified.

13. The control method of claim 12, wherein the predetermined condition information comprises information about power output execution or power output cutoff of the auxiliary power supplier and information about on or off control of the switch corresponding to each of the corresponding power failure location information.

14. The control method of claim 9, further comprising releasing an autonomous driving mode for the autonomous driving and outputting a warning message in response to the main power supplier being included in the power failure location.

15. The control method of claim 14, further comprising outputting the warning message in response to at least one of the junction block, the integrated central control unit or the controller being included in the power failure location.

16. The control method of claim 9, further comprising:
outputting a warning message in response to the main power supplier being included in the power failure location; and
terminating a control for an autonomous driving in response to a user operation for releasing an autonomous driving mode for the autonomous driving being received within a preset period of time in response to the outputting of the warning message; or
controlling the vehicle to pull over onto a side of a road or controlling the vehicle to head to an auto repair shop within a predetermined distance range in response to the user operation not being received within the preset period of time.

17. A vehicle comprising:
a power supplier;
a junction block configured to supply power from the power supplier;
an integrated central control unit configured to receive the power from the junction block;
a controller configured to receive the power through the integrated central control unit and to control at least one load unit of the vehicle; and
a control unit configured to identify a power failure location of the vehicle and to determine a power supply method of the junction block during an autonomous driving of the vehicle, based on power monitoring information of each of the integrated central control unit, the junction block, and the controller and predetermined condition information, the predetermined condition information comprising power supply state information and power supply method information of each load unit corresponding to each of a plurality of pieces of power failure location information;
wherein the power supplier comprises a main power supplier and an auxiliary power supplier;
wherein the junction block further comprises a switch configured to electrically connect or disconnect the main power supplier and the auxiliary power supplier;
wherein the control unit is further configured to:
control the switch to electrically disconnect the main power supplier and the auxiliary power supplier from each other based on the power failure location; and
control so that the power is supplied through one of the main power supplier and the auxiliary power supplier, based on the control of the switch to electrically disconnect the main power supplier and the auxiliary power supplier from each other; and
wherein the control unit is further configured to:
output a warning message in response to the main power supplier being included in the power failure location; and
terminate a control for the autonomous driving in response to a user operation for releasing an autonomous driving mode for the autonomous driving being received within a preset period of time in response to the output of the warning message; or
control the vehicle to pull over onto a side of a road or control the vehicle to head to an auto repair shop within a predetermined distance range in response to the user operation not being received within the preset period of time.

18. The vehicle of claim 17, wherein:
the junction block comprises a first junction block configured to supply the power to the integrated central control unit and a second junction block and a third junction block configured to receive the power from the integrated central control unit;
the first junction block is provided between the main power supplier and the second junction block;
the third junction block comprises the switch; and
the switch is provided between the auxiliary power supplier and the second junction block.

19. The vehicle of claim 18, wherein the power monitoring information of each of the integrated central control unit, the junction block and the controller comprises monitoring information of a battery power and an ignition power of the integrated central control unit, monitoring information of an ignition power of the second junction block, monitoring information of an ignition power of the third junction block, and monitoring information of an ignition power of the controller.

20. The vehicle of claim 19, wherein the predetermined condition information comprises corresponding power failure location information, depending on whether a current of the battery power of the integrated central control unit, a current of the ignition power of the integrated central control unit, a current of the ignition power of the second junction block, a current of the ignition power of the third junction block, and a current of the ignition power of the controller are identified.

* * * * *

UNITED STATES PATENT AND TRADEMARK OFFICE
CERTIFICATE OF CORRECTION

PATENT NO. : 12,258,046 B2
APPLICATION NO. : 17/897627
DATED : March 25, 2025
INVENTOR(S) : Park et al.

Page 1 of 1

It is certified that error appears in the above-identified patent and that said Letters Patent is hereby corrected as shown below:

In the Claims

In Column 16, in Claim 1, Line 30, after "information of" delete "each of".

Signed and Sealed this
Twenty-ninth Day of April, 2025

Coke Morgan Stewart
*Acting Director of the United States Patent and Trademark Office*